(12) United States Patent
Taylor et al.

(10) Patent No.: US 6,578,467 B1
(45) Date of Patent: Jun. 17, 2003

(54) ELECTRICAL BEVERAGE MAKING APPARATUS

(75) Inventors: John Crawshaw Taylor, Castletown (GB); Vernon James Donnelly, Braddan (GB)

(73) Assignee: Strix Limited, Ronaldsway (GB)

( * ) Notice: Subject to any disclaimer, the term of this patent is extended or adjusted under 35 U.S.C. 154(b) by 0 days.

(21) Appl. No.: 09/856,879

(22) PCT Filed: Nov. 26, 1999

(86) PCT No.: PCT/GB99/03980

§ 371 (c)(1),
(2), (4) Date: Feb. 12, 2002

(87) PCT Pub. No.: WO00/30514

PCT Pub. Date: Jun. 2, 2000

(30) Foreign Application Priority Data

Nov. 26, 1998 (GB) ................................................ 9826961

(51) Int. Cl.⁷ ............................................. A47J 31/047
(52) U.S. Cl. .............................. 99/281; 99/292; 99/303
(58) Field of Search .......................... 99/292, 281, 282, 99/283, 280, 303

(56) References Cited

U.S. PATENT DOCUMENTS

| | | | |
|---|---|---|---|
| 2,223,450 A | | 12/1940 | Jepson et al. |
| 2,262,286 A | | 11/1941 | Ireland |
| 2,287,571 A | | 6/1942 | Purpura |
| 2,619,895 A | | 12/1952 | Schott |
| 2,690,709 A | | 10/1954 | Farr et al. |
| 2,856,844 A | | 10/1958 | Price |
| 3,224,360 A | * | 12/1965 | Wickenberg et al. ......... 99/292 |
| 3,651,947 A | | 3/1972 | Schollhamer |
| 4,843,954 A | | 7/1989 | Henn |
| 5,699,718 A | * | 12/1997 | Yung et al. .................... 99/292 |

FOREIGN PATENT DOCUMENTS

| | | |
|---|---|---|
| CH | 130 121 A | 11/1928 |
| EP | 0288899 A2 | 11/1988 |
| EP | 0 292 649 A1 | 11/1988 |
| EP | 0 951 853 A1 | 10/1999 |
| FR | 1165774/72 253 E | 3/1972 |
| GB | 538.189 A | 7/1941 |
| GB | 604 320 | 7/1948 |
| GB | 980 710 | 1/1965 |
| GB | 1332 656 A | 3/1973 |
| GB | 2 212 385 A | 7/1989 |
| GB | 2 258 141 A | 2/1993 |
| GB | 2 316 847 A | 3/1998 |
| GB | 2 323 267 A | 9/1998 |
| WO | WO 00/30513 | 6/2000 |

OTHER PUBLICATIONS

JP8196426 A 96 806 Japanese Patent Abstract Drawings (Sharp).

* cited by examiner

Primary Examiner—Reginald L. Alexander
(74) Attorney, Agent, or Firm—McCormick, Paulding & Huber LLP

(57) ABSTRACT

An electric coffee maker (2) comprises a first chamber (4), and a second chamber (6) arranged on top of the first chamber. A tube (8) extends down from the second chamber (6) into the first chamber (4) for transferring liquid between the two chambers. The base (20) of the first chamber (4) is provided with electric heater (24) and a thermally responsive control (46) is provided associated with the base (20) so as to be responsive to the temperature of the heater (24) or to a section of the base (20) for interrupting the power supply to or reducing the heating output of the heater (24).

27 Claims, 3 Drawing Sheets

ELECTRICAL BEVERAGE MAKING APPARATUS

BACKGROUND OF THE INVENTION

The present invention relates to electrical beverage making appliances and in particular, but not exclusively to electric coffee makers.

A known type of coffee maker beverage type is known which comprises two chambers: a first chamber for receiving water to be heated; and a second chamber which is seated on top of the first chamber and which receives the coffee grounds. The second chamber is in fluid communication with the first chamber through a water transfer pipe which extends down from the second chamber into the first chamber. A separator arranged at the top of the water transfer tube allows water to flow into and out of the upper chamber while retaining the coffee grounds. In use, the liquid in the first chamber is heated externally, for example by a gas or spirit flame or an electric element arranged under the chamber. As water in the first chamber heats, the pressure in that chamber increases causing the water in the first chamber to rise up through the transfer pipe into the second chamber where it infuses with the coffee grounds. Eventually, the level of liquid in the first chamber falls below the bottom of the tube, and transfer of liquid stops. The heating is then discontinued and the first chamber then cools so that steam will begin to condense on the inside of the lower chamber. When it does so, a partial vacuum is created in the first chamber which causes infused beverage to be sucked back down the tube through the separator into the first chamber. When all the beverage has been sucked down into the first chamber, the second chamber can be removed and the beverage be served from the first chamber.

Such an appliance is disclosed in GB 1,332,656. In that appliance, an electric heating element or a gas flame is arranged under the first chamber and controlled by a thermally responsive actuator arranged in the second chamber. The actuator senses the temperature of the atmosphere in the second chamber and when it reaches a predetermined temperature either discontinues the electrical supply to the heating element or operates a valve in the gas supply to the gas flame.

One problem with the above arrangement is that it is difficult and expensive as the actuator is arranged remotely from the heating source which means that connections have to be made between the two. This results in unsightly and unnecessary housings or shrouds being provided in the apparatus and unnecessary expense. A further problem is that the heating of liquid in the first vessel is slow and inefficient and after the sensor has cut off the element considerable amounts of heat continue to flow from the heater into the apparatus.

DISCLOSURE OF THE INVENTION

The present invention seeks to overcome the above problems, and from a first aspect, therefore, provides a beverage maker comprising:
 a first chamber;
 a second chamber arranged on top of said first chamber;
 a tube extending down from said second chamber into said first chamber for transferring liquid between the two chambers; wherein:
  the base of said first chamber is provided with electric heating means and thermally responsive control means are provided associated with the said base so as to be responsive to the temperature of the heating means or a section of the base for interrupting the power supply to or reducing the heating output of the heating means.

Thus in accordance with the invention, the base of the first chamber is provided with electrical heating means and power to the heater is interrupted or the heating output thereof substantially reduced in response to the heater or a portion of the base reaching a predetermined temperature. This stops, or at least substantially reduces heating of the liquid in the lower chamber, so as to stop boiling. The first chamber then cools, water begins to condense on the wall of the first chamber and transfer of infused beverage from the second chamber will commence.

This arrangement allows the liquid in the first chamber to be heated efficiently, accurate control to be achieved and obviates the need for unsightly and cumbersome electrical connections between the first and second chambers.

The control means of the invention may be arranged to operate in one of a number of ways. In a first embodiment, the control means is configured and arranged so as to detect when a portion of the base of the first chamber boils dry, which indicates that a predetermined amount of the liquid in the first chamber has been transferred to the second chamber. This condition can easily be detected by a suitable thermal sensor in thermal contact with the base or the heater since in the absence of water which cools the base or heater, the temperature of the base or heater will rise very quickly.

In an arrangement as described above, preferably only a specified portion of the base or heater boils dry, such that water still covers the remainder of the base.

This may be achieved in a number of ways. For example the base or heater may be provided with a locally raised region which boils dry. This region could, for example be formed as a raised region of a heater plate such as is disclosed in Applicant's GB 2,316,847 to which reference can be made for further detail. A suitable sensor may then be arranged under the raised region which will become exposed in advance of the remainder of the base.

In an alternative arrangement, the base or heater of the first chamber may be generally planar, but arranged to slope such that a peripheral region thereof will become exposed and overheat as the liquid level in the first chamber drops as liquid is transferred to the second chamber. A suitable sensor may be arranged under that part of the base or heater.

Preferably, however, the base is provided with a region which is separated from the remainder of the region by a raised wall. Most preferably, the wall surrounds the entire heated region of the base. This wall forms a reservoir of water above the heater in the base, and it will be appreciated that the higher is this wall, the longer it will take for water within the reservoir to evaporate, and thus for the control to operate. This allows a mechanism by which the beverage infusion time can be varied since that is dependent upon how long the water remains in the second chamber. This is, in turn dependent upon maintaining the pressure in the first chamber, which in turn depends on the continued boiling of liquid in the first chamber. Thus in a preferred embodiment, the wall is adjustable in height to allow for adjustment of the beverage infusion time.

A further way in which the infusion time can be varied is by varying the power of the heating element. If the element is heats at low power, then it will take longer for the liquid in the reservoir to boil away, thereby maintaining the vapour pressure in the first chamber for a longer period, thereby keeping the hot water in the second chamber infusing for a longer period of time. Conversely, if the element heats at high power, then liquid in the reservoir will boil away more quickly, thereby reducing the infusion time. In one embodiment of the invention therefore, means may be provided for varying the power of the heating element. Means for achieving such a power variation will be readily conceivable by the skilled person and are thus not described in further detail here.

A yet further way in which the infusion time could be varied would be to have an additional heater which heats a portion of the base which would still be covered by water after the main heating element has been switched off. This element need not be particularly high power, say 50 W, but even at that low power it would generate sufficient vapour to maintain the vapour pressure in the first chamber. The additional heater could be switched off after a predetermined time to bring the infusion period to an end.

In the embodiments described above, the temperature of the base or heater can be sensed in any convenient manner. Preferably, however, the temperature is sensed using a thermomechanical sensor such as a bimetallic actuator arranged in good thermal contact with the base or heater. In the preferred embodiment, a pair of actuators most preferably operable at substantially same temperature can be employed to sense the overheating condition.

A suitable control of this type is disclosed in Applicant's WO95/34187. Such a control is equally suitable for engagement with heaters having sheathed elements or with thick film heaters.

A possible disadvantage with the above control arrangement is that with repeated boiling dry of an area of the lower chamber base, scale may be deposited on the base, which would be unsightly. In an alternative arrangement, therefore, the control means is configured and arranged to sense boiling of the liquid in the first chamber via a portion of the base of the vessel. This can be done by sensing the localized boiling dry of a section of the heater, for example by using a system as disclosed in GB 2,283,155. Preferably, however, boiling is sensed by means of a system as disclosed in Applicant's WO96/01875 and WO98/36616, or in unpublished United Kingdom Patent Application No. 9805751.6 which for the purposes of sufficiency is attached as Appendix I hereto.

In accordance with such systems, a relatively low volume sump will be provided in the heated base of the first chamber, and a thermally sensitive actuator mounted in thermal contact with that sump. When liquid is heating in the first chamber, the temperature of the liquid in the sump lags behind that in the main body of liquid, as there is little convection within the sump. However, when the liquid in the first vessel boils, the liquid in the sump is quickly displaced and the sump temperature quickly rises. This rise in temperature can be sensed by suitable means.

Depending on the boiling time required, the actuator may be mounted in close thermal contact with, or thermally more remote from the sump. If a variable boiling time is required (to vary the infusion time—the longer the boil, the longer liquid will be held ion the second chamber), means can be provided to increase or decrease the length of time it takes the actuator to reach operating temperature. Such means might comprise heat sinks which could selectively be introduced into the thermal path between the sump and the actuator.

A control arrangement of the above type has the additional advantage that the first chamber can be used as a traditional kettle, since it will switch off when boiling is detected, irrespective of the presence or absence of a further chamber. All that is required is that the pouring spout of the first chamber is configured such that it may sealingly receive the second chamber with its depending tube.

This is in itself a novel arrangement, and from a further aspect the invention provides a water heating vessel comprising a water receiving chamber, the base of said chamber being provided with electric heating means, and further comprising thermally responsive control means are associated with the said base for sensing when the water in the chamber is boiling so as to interrupt the power supply to or reduce the heating output of the heating means, said chamber further being provided with a pouring spout which is adapted and arranged sealingly to receive the neck of an infusion receiving chamber.

Preferably, the spout is centred on a vertically extending axis, and preferably is tapered to receive a tapering seal such as a rubber bung. If necessary, a suitable spout cover may be supplied to at least partially close the spout when it is being used as a kettle.

The heating means used in an appliance in accordance with the invention may comprise a sheathed heating element attached to the underside of the base, for example through a heat diffusion plate. Such constructions are well known in the art and so need not be described further here.

In a preferred embodiment, however, the heating means comprises a so-called thick film heater provided on the base. Such heaters are becoming more commonly in the water heating art and comprise a electrically resistive heating track deposited on an insulated substrate. Typically the insulated substrate is provided by an insulating layer laid down on a stainless steel plate. Examples of such heaters are disclosed, for example, in WO 98/36618 and WO96/17496.

The heater may be provided over the whole of, or merely a part of the base of the first chamber. In the preferred embodiment, the heater is formed as a separate unit mounted in a suitable aperture formed in the base of the first chamber.

The heating means of the apparatus may comprise an element which keeps the infused beverage in the first chamber warm after the control of the apparatus has operated. This "keep warm" element may be provided in a number of ways.

In a first arrangement, a keep warm element may be provided which is separate from the main heating element. This keep warm element may be energised the whole time the main heating element is energised or may be switched on only after the control has operated to switch off the main heating element. In an alternative arrangement, the keep warm element may be connected into series with the main heating element after boiling has been sensed. The resistance of the main element (which would typically be an order of magnitude smaller than that of the keep warm element) means that very little heat is generated in the main element part when so connected.

The keep warm element may be arranged to cycle, for example in a manner as described in WO97/04694. In such an arrangement the temperature of the base would be monitored and the keep warm element operated in response to the base temperature. This arrangement is particularly suited to use with sheathed heating elements. However, it has the disadvantage that the temperature of the base may be such as to cause localized boiling of the beverage in the first chamber during the heating bursts, which may be detrimental to the flavour of the beverage.

Preferably, therefore, the keep warm element is energized continuously after operation of the vessel control, but at such a power level that will not cause the beverage in the first chamber to boil. The power required to achieve this can be easily determined empirically by the skilled person. In this case, the element will probably be a thick film type heater whose power level and power density can very easily be tailored to meet particular requirements. Typically, however, one might have a main heating element rated at 1500 W at a Watts density of 50–150 Wcm$^{-2}$ and a keep warm element rated at 50 W at a watts density of 10 Wcm$^{-2}$. A general track arrangement and switching arrangement suitable in principal for achieving such a heating regime is disclosed in GB9805751.6.

It is believed that the above arrangement constitutes an invention in its own right, so from a further aspect the invention provides a beverage maker comprising:

a first chamber;

a second chamber arranged on top of said first chamber;

a tube extending down from said second chamber into said first chamber for transferring liquid between the two chambers; wherein:

the base of said first chamber is provided with electric heating means for keeping infused beverage in the first chamber warm, the heating means being rated such that it will not cause boiling of the infused beverage in the lower chamber.

The lower chamber is preferably configured as a cordless arrangement whereby it my be removably positioned on a power supply stand. This considerably facilitates pouring of the beverage.

BRIEF DESCRIPTION OF THE DRAWINGS

Some preferred embodiments of the invention will no be described by way of example only with reference to the accompanying drawings in which.

DETAILED DESCRIPTION OF THE INVENTION

Figure 1:
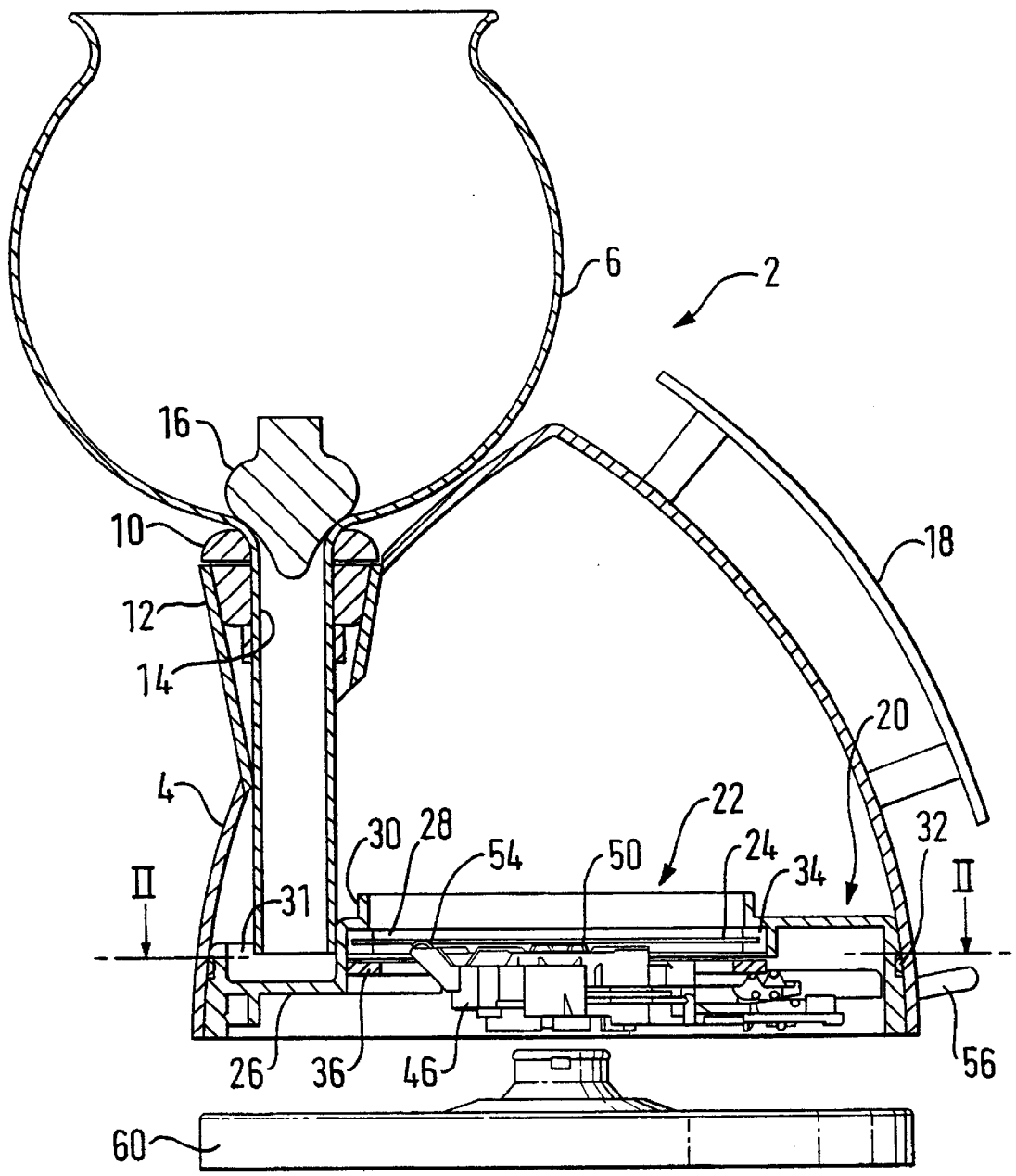
FIG. 1 shows a schematic partial cross section through an appliance in accordance with a first embodiment of the invention.

With reference to FIG. 1, a coffee making appliance 2 comprises a first, lower, water receiving chamber 4 and a second, upper, coffee receiving chamber 6. The lower chamber 4 is preferably formed from a plastics material most preferably a transparent or translucent plastics material and the upper chamber 6 which is preferably of glass.

The upper chamber 6 is formed with a tube 8 which extends down into the lower chamber 4. The upper chamber 6 is supported on the lower chamber 4 by a sealing bung 10 which is mounted in the spout 12 of the lower chamber 4. The bung 10 is provided with a central bore for receiving the tube 8. A separator 16 is supported in the lower part of the upper chamber 6 and permits heated water to enter the upper chamber 6 from the lower chamber 4 and thereafter to allow infused beverage to enter the lower chamber 4 from the upper while retaining coffee grounds.

The lower chamber is provided with a handle 18 to facilitate pouring of the coffee therefrom.

The lower chamber 4 has a base 20 which has an electrically heated portion 22 formed by a thick film heater 24. The base is formed as a plastics moulding 26, for example of nylon, having a central circular opening 28 for receiving the heater 24, with an upstanding wall 30 arranged around the opening 28 for a purpose which will be described further below. The moulding 26 is also formed with a well 30 for receiving the lower end of the tube 8.

The moulding 26 is mounted to close the bottom of the lower chamber 4, with a seal 32 arranged therebetween. The moulding may be retained in the lower chamber by any suitable means such as bonding or welding.

The thick film heater 24 is supported in a silicone rubber sealing ring 34 which is clamped into the opening 28 by a clamping ring 36 which has a number of bores around its periphery to receive fastening screws which engage in bores (not shown) in the moulding 26.

Figure 3:
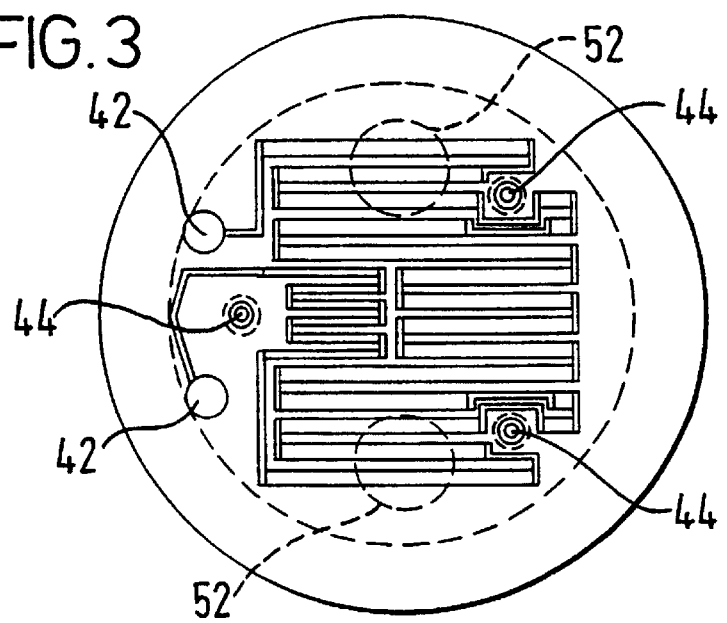
FIG. 3 shows a heater layout for use in the embodiment of FIGS. 1 and 2.

The thick film heater 24 for use in the above embodiment is shown in FIG. 3. It comprises, in a known manner, a circular stainless steel plate of 0.9 to 1 mm thickness provided with an insulating layer and a resistive heating track 40, which in use faces downwardly. The track 40 is rated at about 1500 W. Electrical contact pads 42 are provided at the respective ends of the heating track as shown, and is provided with three upstanding studs 44 for receiving a thermally sensitive control unit 46.

The thermally sensitive control unit 46 is mounted to the underside of the heater 26. The control unit 46 is the applicant's commercially available U28 control unit which comprises, inter alias, a pair of snap acting bimetallic actuators, 50 operable at substantially the same temperature and which in use will engage regions 52 of the heater 26 when the control unit 46 is mounted in position. It also comprises a pair of spring contacts 54 which make contact with the contact pads 42 of the heater, and an on/off lever 56. The U28 is itself an adaptation of the Applicant's U18 control for use with thick film heaters. The U18 is described at length in WO 95/34187 and reference should be made for details of its mode of operation.

The control unit 46 also incorporates a cordless electrical connector which will allow power to be supplied to the heater 26 when the lower vessel is placed on a power supply stand 60.

The mode of operation of the above embodiment will now be described. Firstly, coffee grounds are placed in the upper chamber 6 and water in the lower chamber 4. The lower chamber is then placed on the power supply stand 60 and the unit switched on by the lever 56.

The water in the lower chamber will begin to heat and when its temperature reaches typically about 60° C. the pressure in the lower chamber 4 has risen sufficiently to begin forcing the water up the tube 8 through the separator 16 and into the upper chamber 6. Eventually, the water in the lower chamber 4 will begin to boil at which point water will very quickly rise through the tube 8 and into the upper chamber 6. The level of water in the lower chamber 4 will then fall very rapidly fall to the upper edge of the wall 30 around the heater 26. This wall 30 acts as a reservoir to contain a pool of water which will continue to boil for a period of time determined by the height of the wall 30. Effectively, the higher the wall 30 the longer the liquid in the reservoir will boil which in turn means the longer will be maintained the pressure in the lower chamber 4. This in turn means that the water will remain for a longer period in the upper chamber 6, thereby giving longer infusion and a stronger brew.

When the reservoir has boiled dry, the heater 26 will rise very quickly in temperature and this rise is detected by one or both of the actuators 50 of the control unit 46 which will then operate in a known manner to switch off the power supply to the heater 26.

In time, the steam in the lower chamber 4 will begin to condense thereby forming a vacuum in the lower chamber 4 which will suck the infused beverage from the upper chamber 6 through the separator 16 back into the lower chamber 4. The upper chamber 6 can then be removed and coffee dispensed from the lower chamber.

Figure 4:
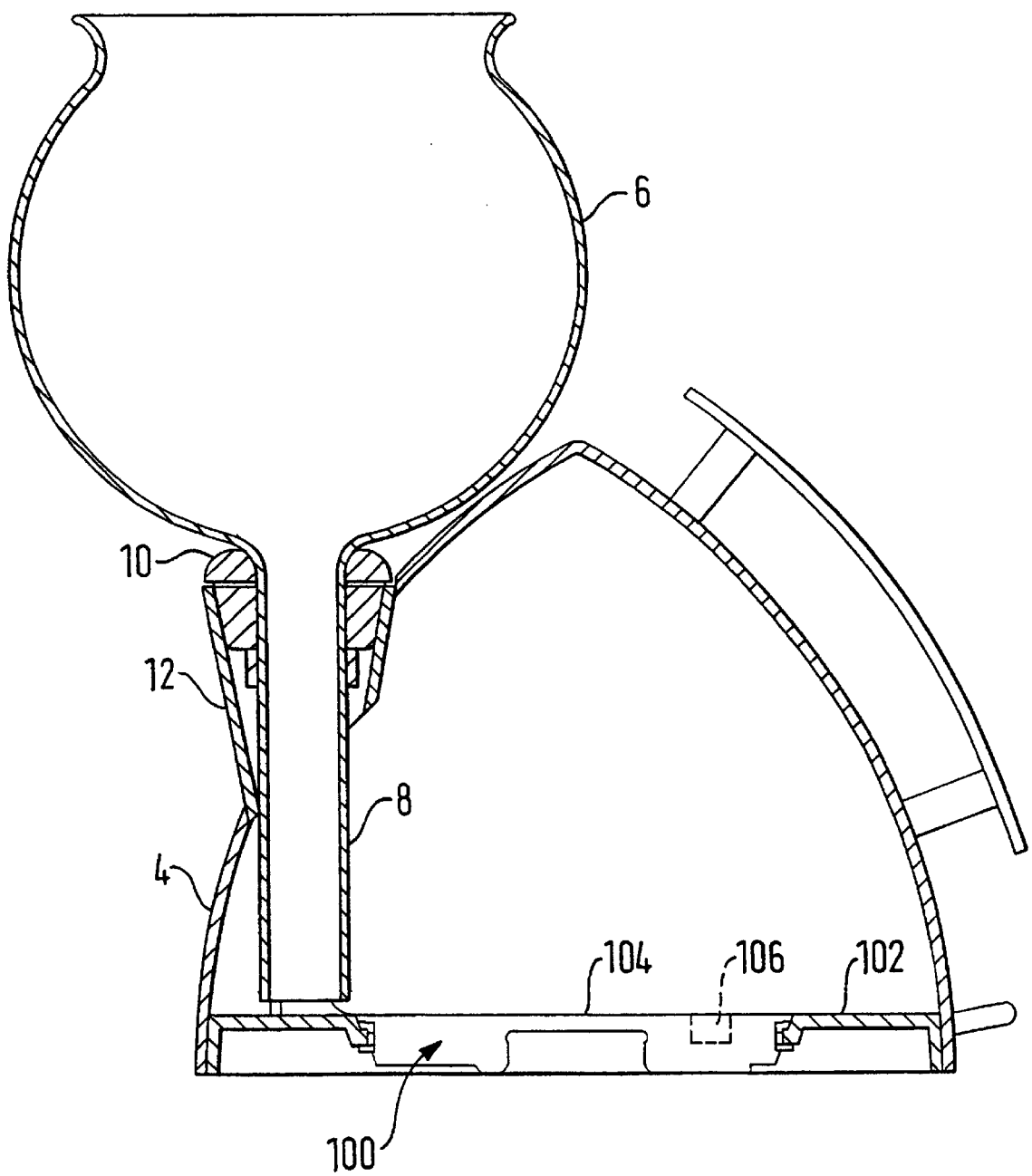
FIG. 4 shows a further embodiment of the invention.

Turning now to FIG. 4, a second embodiment of the invention is shown schematically. This embodiment operates on the principal of detecting boiling of liquid within the lower chamber 4 through a low volume sump provided in the base of the lower chamber 4, rather than by the boiling dry of a portion of the base.

In this particular embodiment, an integrated control and heater unit 100 of the type disclosed in the Applicant's International patent application no. WO99/48333 is mounted in the base of the lower chamber 4. In particular, the unit 100 is mounted to a moulding 102 which is retained in the bottom of the lower chamber 4 in the same manner as the in the earlier embodiment.

As can be seen with reference to the description of WO99/48333, the unit 100 comprises a heater plate on its upper surface 104 which includes a relatively small volume sump 106 (shown schematically in FIG. 4). A bimetallic actuator is arranged in thermal contact with the external base of the sump such that when liquid in the vessel begins to boil, the water in the sump (which up to that point has remained cool relative to the bulk of water on the lower chamber 4) is displaced by hotter water and the sump temperature rises. This rise in temperature is sensed by the bimetallic actuator to discontinue boiling of the water.

In this embodiment of the invention, as in the earlier embodiment, as water is heated in the lower chamber 4, it will begin to rise through the tube 8 into the upper chamber 6, slowly at first and then quite rapidly when boiling occurs. The boiling of the water in the lower chamber 4 is detected by the control unit 100 and after a given time (determined largely by the thermal path between the sump and the actuator), the main heating effect is discontinued.

After some time water will condense in the lower chamber 4 and the infused beverage be sucked back into the lower chamber 4 from where it may be dispensed.

In the integrated heater and control unit disclosed in WO99/48333, after boiling has been discontinued, a keep warm element (which actually includes the main heating element) is energised to keep liquid warm. In that arrangement, the keep warm element is about 30 W and is concentrated in one region so as to cause localised boiling for aesthetic effect. In the present embodiment of the invention, such a keep warm element is still preferably provided, although ideally the keep warm element will be spread out over a larger area to reduce the watts density thereof so as not to cause localised boiling in the lower chamber 4 which might harm the flavour of the coffee.

It will be seen that the above described second embodiment of the invention has the advantage that the lower chamber 4 can also be used as an ordinary kettle, simply by removing the upper chamber 6 and bung 10. The kettle will still switch off after liquid boils in the lower chamber irrespective of whether the upper chamber is provided.

It will be noted that the spout 12 of the lower chamber is arranged generally vertically and is tapered to receive the sealing bung 10 for the upper chamber. If necessary, means may be formed on the spout to assist in retention of the bung 10. A separate spout cover may be provided with the appliance to at least partly cover the spout when the lower chamber 4 is being used as a kettle.

Figure 2:
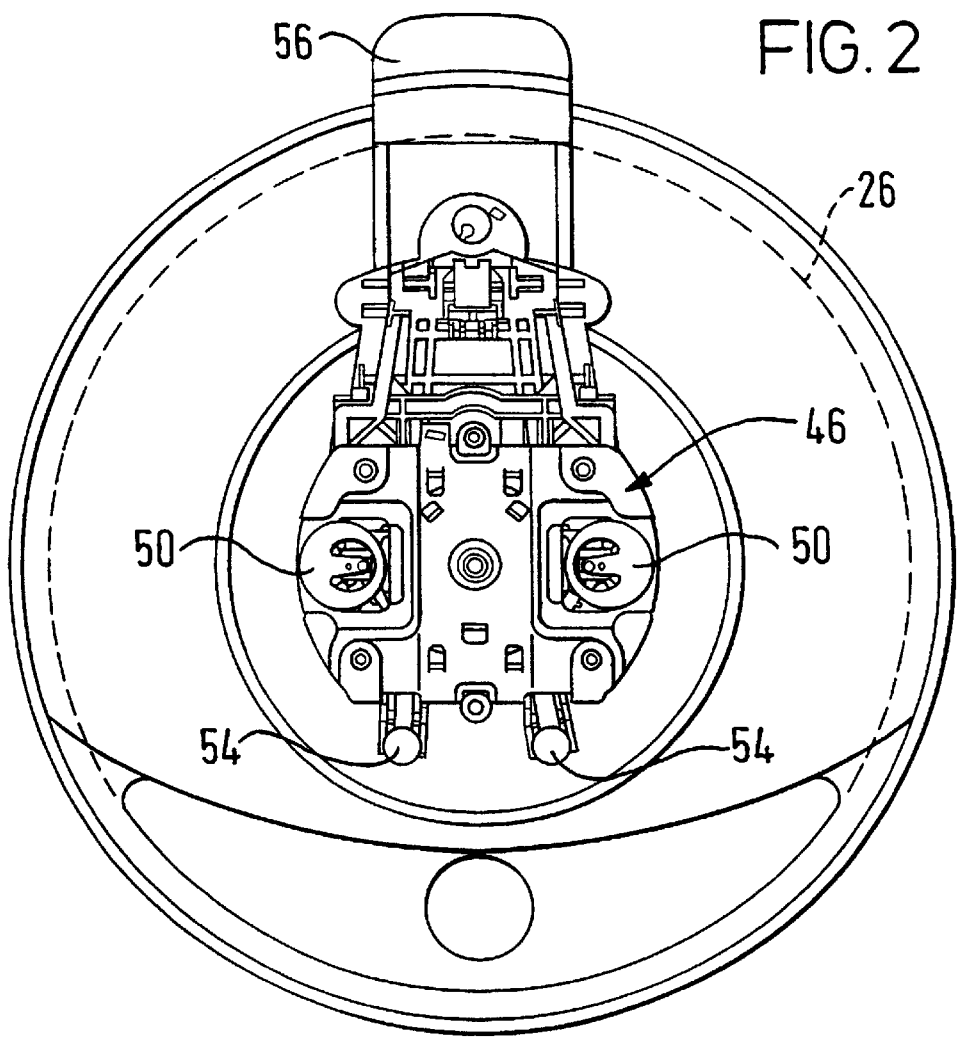
FIG. 2 shows a view along line II—II of FIG. 1, with the heater removed for clarity.

It will be appreciated that the above description is by way of example only and that modifications may be made to the embodiments described without departing from the scope of the invention. For example in the embodiment of FIGS. 1 and 2, the beverage infusion time may be varied in a number of ways. For example, the height of the wall 30 surrounding the heater could be made variable by a suitable mechanism. Alternatively, the heating power of the heating element may be varied so that the reservoir defined inside the wall 30 takes a longer or shorter time to boil dry. This could be achieved, for example by selectively connecting further resistance in series with the heating element.

In a yet further arrangement, an additional heater could be positioned in the base of the well 31 defined in the base moulding 26. Once the liquid in the reservoir defined within the wall 31 boils dry, there will still be liquid within the well 31, and if this is heated after the main heating element is turned off, then it will maintain to some extent the pressure in the lower chamber 4 so as to keep the water in the upper chamber 6 for longer. The additional element can be deenergised after a predetermined or variable time period. Such a heater could also be energised to act as a keep warm element to keep the infused beverage warm after it has returned to the lower chamber 4.

What is claimed is:

1. A beverage maker, comprising:
    a first chamber having a base that includes an electronic heating means and a control means;
    a second chamber arranged on top of the first chamber;
    a tube extending down from the second chamber into the first chamber for transferring liquid between the two chambers;
    wherein the control means is thermally responsive to the temperature of the electronic heating means or to a section of the base, and the control means is operable to interrupt a power supply to the electronic heating means or to reduce the heating output of the electronic heating means when a portion of the base of the first chamber boils dry; and
    wherein the portion of the base that boils dry is separated from the remainder of the base by a raised wall to define a reservoir of liquid that must boil away before the control means operates.

2. The beverage maker of claim 1 wherein the raised wall surrounds the entire heated region of the base.

3. The beverage maker of claim 2 further comprising a thermal sensor in thermal contact with one or both of the base of the first chamber and the electronic heating means.

4. The beverage maker of claim 3, further comprising means for adjusting the infusion time of a beverage in the second chamber.

5. The beverage maker of claim 4 wherein the means for adjusting the infusion time of a beverage in the second chamber includes one of a plurality of raised walls, each having a different height, wherein each different height raised wall creates a different infusion time for the beverage in the second chamber.

6. The beverage maker of claim 4, wherein the means for adjusting the infusion time of the beverage in the second chamber comprises means for varying the power of the electronic heating means.

7. The beverage maker of claim 6, wherein the means for adjusting the infusion time comprises a secondary heater that is positioned relative to the base so that the secondary heater heats a portion of the base which is still covered by water after the electronic heating means has been de-energized.

8. The beverage maker of claimed 7, wherein the electronic heating means comprises a sheathed heating element attached to an under side of the base.

9. The beverage maker of claim 7, wherein the electronic heating means comprises a thick film heater provided on the base.

10. The beverage maker as claimed in claim 9, wherein the electronic heating means is formed as a unit mounted in an aperture formed in the base of the first chamber.

11. The beverage maker as claimed in claim 10 comprising a keep-warm heating element that keeps the infused beverage in the first chamber warm after the control of the apparatus has operated.

12. The beverage maker of claim 11 wherein the keep-warm heating element is a separate element to the electronic heating means.

13. The beverage maker of claim 12 wherein the keep-warm heating element is energized at such a power level as not to cause the beverage in the first chamber to boil.

14. The beverage maker of claim 1, further comprising a thermal sensor in thermal contact with one of the base of the first chamber or the electronic heating means.

15. The beverage maker of claim 14, further comprising means for adjusting the infusion time of a beverage in the second chamber.

16. The beverage maker as claimed in claim 15 comprising a keep-warm heating element that keeps the infused beverage in the first chamber warm after the control of the apparatus has operated.

17. The beverage maker of claim 1, further comprising means for adjusting the infusion time of a beverage in the second chamber.

18. The beverage maker as claimed in claim 17 comprising a keep-warm heating element which keeps the infused beverage in the first chamber warm after the control of the apparatus has operated.

19. The beverage maker of claim 17, wherein the means for adjusting the infusion time of a beverage in the second chamber includes one of a plurality of raised walls, each having a different height, wherein each different height raised wall creates a different infusion time for the beverage in the second chamber.

20. The beverage maker of claim 17, wherein the means for adjusting the infusion time of the beverage in the second chamber comprises means for varying the power of the electronic heating means.

21. The beverage maker of claim 17, wherein the means for adjusting the infusion time comprises a secondary heater that is positioned relative to the base so that the secondary heater heats a portion of the base which is still covered by water after the electronic heating means has been de-energized.

22. The beverage maker of claim 1, wherein the raised wall has a height selected to create a predetermined infusion time for the beverage in the second chamber.

23. The beverage maker of claim 1, further comprising means for varying the power of the electronic heating means.

24. The beverage maker of claim 1, further comprising a secondary heater that is positioned relative to the base so that the secondary heater heats a portion of the base which is still covered by water after the electronic heating means has been de-energized.

25. The beverage maker as claimed in claim 1, comprising a keep-warm heating element that keeps the infused beverage in the first chamber warm after the control of the apparatus has operated.

26. The beverage maker of claim 25 wherein the keep-warm heating element is energized at such a power level as not to cause the beverage in the first chamber to boil.

27. A beverage maker, comprising:
- a first chamber having a base that includes a first reservoir and a second reservoir;
- a first reservoir heater disposed adjacent the first reservoir;
- a second reservoir heater disposed adjacent a second reservoir;
- a second chamber in fluid connection with the first chamber;
- a passage extending between the first chamber and the second chamber for transferring liquid between the two chambers;
- a controller that is thermally responsive to the temperature of the first reservoir heater or to the temperature of a section of the base, wherein the controller is operable to interrupt a power supply to the first reservoir heater or to reduce a thermal output of the first reservoir heater when the first reservoir boils dry.

* * * * *